United States Patent Office 3,499,748
Patented Mar. 10, 1970

3,499,748
BACTERIA INOCULATED PLASTER OF PARIS AND AGRICULTURAL SEEDS ADMIXED THEREWITH
Margaret Evelyn Fraser, London, England, assignor to Allen & Hanburys Limited, London, England, a British company
No Drawing. Filed Aug. 10, 1966, Ser. No. 571,423
Claims priority, application Great Britain, Aug. 18, 1965, 35,445/65
Int. Cl. A01n 21/02
U.S. Cl. 71—7
4 Claims

ABSTRACT OF THE DISCLOSURE

A product for seed inoculation is produced which comprises porous plaster of Paris granules containing about 0.01 to about 0.2% of a setting retarder, which plaster of Paris granules are inoculated with a culture of Azotobacter or Rhizobia bacteria containing a nutrient substance for said bacteria, the inoculation being effected by treating the granules with a liquid culture containing the bacteria and the nutrient substance. Additionally, a plant seed product is produced which comprises agricultural seeds admixed with the above inoculated porous plaster of Paris granules. The granules are mixed with the seeds in a weight ratio of from about 1:2 to about 1:50 and the ratio of size of seeds to size of granules is from about 1:1 to about 1:1.2.

---

This invention relates to inoculant preparations and to processes for aiding agricultural plants in the assimilation and utilization of basic nutrients It has long been known that soils contain a population of microbes or soil bacteria, many of which play a role in the breakdown of soil materials to form plant nutrients or in the fixation of atmospheric nitrogen so as to assist the plant in assimilating and utilising these nutrients.

*Bacillus megatherium* var. *phosphaticum*, for example enables plants to utilise phosphorus whereas cellulytic bacteria break down cellulose material to form humus.

The nitrogen-fixing bacteria, upon which many agricultural plants depend for the proper utilisation of atmospheric nitrogen are better known than these two aforesaid organisms.

Examples of nitrogen-fixing bacteria are Rhizobia which normally exist symbiotically in the nodules of legumes such as lucerne and clover, and Azotobacter which occur free in the soil and are of importance for crops such as maize and sugar beet.

In view of the economic importance of lucerne and clover it has become accepted practice for farmers to use inoculation methods in order to ensure successful establishment of the seed in low fertility soil.

Bacterial cultures are commercially available for this purpose, either as agar slope cultures or as peat cultures to enable farmers to inoculate their seeds. These processes of inoculation are not only tedious to carry out but have the further disadvantage that the bacteria will not survive in this state for more than 24 hours, and any delay in sowing such as may be caused by adverse weather conditions will make the inoculation less effective.

In order to overcome these difficulties attempts have been made to provide pre-inoculated seed preparations in stabilised forms. These forms can be divided into the following two types, depending on their method of preparation:

(a) Seed pellets having peat cultures of Rhizobia bacteria incorporated inside or outside the pellet made by applying various glues and mainly inorganic coating material to the seeds.

(b) Seeds directly inoculated by forcing bacteria into the seed at super-atmospheric or sub-atmospheric pressures.

Neither of these two methods has proved altogether satisfactory. The pellets prepared by method (a) are difficult to sterilize and they contain sufficient moisture to allow harmful Actinomycetes, which are normal concomitants of peat cultures, to multiply, and further the peat must be carefully selected to avoid harmful constituents. The directly inoculated seeds of method (b) contain a larger number of organisms, but these were not sufficiently available in soil tests to make any significant contribution to subsequent nodulation of seedlings compared with seeds inoculated at normal pressures.

It is an object of this invention to provide stable granulates of bacteria capable of enhancing the growth of agricultural seeds with which they are sown, irrespective of the soil conditions.

The present invention provides porous plaster of Paris granules which have been inoculated with a liquid culture of bacteria, capable of enhancing the growth of agricultural seeds, to which preferably one or more nutrient substances have been added.

According to the invention, there is also provided a process for inoculating porous plaster of Paris granules with liquid cultures of bacteria, capable of enhancing the growth of agriculture seeds, wherein granules prepared from moistened plaster of Paris containing a small proportion of a setting retarder, e.g. from 0.01% to 0.2% of sodium carboxymethyl cellulose, and graded for size according to the seed with which they are to be sown, are sprayed in a rotating tablet coating pan with a liquid culture of bacteria, capable of enhancing the growth of agricultural seeds, to which preferably one or more nutrient substances have been added and dried, for example for 24 hours at between 55° F. and 75° F.

The liquid culture may be percolated through beds of the granules which are then dried for 24 hours at between 55° F. and 75° F. with or without the prior addition of one or more nutrient substances.

The preferred bacteria for use in the present invention are nitrogen-fixing bacteria but other bacteria capable of enhancing the growth of agricultural seeds may be used, for example *Bacillus megatherium* var. *phosphaticum*.

When nitrogen-fixing bacteria are used to inoculate the the plaster of Paris granules they may be, for example, Azotobacter species or Rhizobia bacteria whereas when nitrogen-fixing bacteria are used to inoculate coated seed granules they are preferably Rhizobia bacteria. The nutrient substances which may be used with the bacterial cultures are advantageously skim milk powder and sucrose, mannitol, gum arabic and carboxymethyl cellulose. Examples of adhesives which may be used are sucrose, gums, such as gum tragacanth and gum acacia, gelatine and dextrine.

The inoculated granules are intended to be mixed with seeds at a weight ratio of between 1:2 to 1:50, preferably between 1:5 to 1:50, before sowing, and they are prepared in such a way that when the mixture is shaken they will not separate or disintegrate.

In the presence of moist soil the bacteria carried by the granules multiply and invade the surrounding soil to carry out their beneficial function for the plants in their vicinity.

The advantages of the present invention over existing methods of seed-inoculation can be summarised as follows:

(1) The farmer is spared the involved and time-consuming task of inoculating the seed with agar slant or peat cultures of bacteria. Instead the inoculated granules merely have to be weighed and mixed with the seeds in specified proportions or, in the case of coated seed granules, can be sown directly.

(2) The seeds treated according to the invention may be sown at any time up to the expiry date, whereas existing methods require immediate sowing. (Tests with inoculated seed granules of the present invention showed that nodulation still occurred after 4 months' storage.)

(3) If conditions in the soil are too dry for germination the bacteria are more likely to survive in this protected condition than when applied as a slope culture or peat inoculum.

(4) The bacteria are evenly distributed among the seeds.

(5) The presence of calcium ions has a protective action against acid soil conditions which are known to be harmful to soil bacteria, such as to Rhizobia. Moreover, calcium is important for the growth of these organisms.

(6) The bacteria do not come into direct contact with the seed coats which in some cases contain antibacterial substances.

The following examples illustrate the invention.

EXAMPLE 1

3 kg. of plaster of Paris ($CaSO_4 \cdot \frac{1}{2} H_2O$) was moistened with 1000 ml. of a 0.1% by weight of sodium carboxymethyl cellulose in water and pressed through a sieve. The granules produced were dried at room temperature for 24 hours.

The dry granules were graded for size by further sieving, the sieves being chosen according to the size of the seed with which the granules were intended to be sown (the ratio of seed size to granule size must not exceed 1 to 1.2). For lucerne seed, the granules were initially pressed through a number 10 B.S. sieve and the final sizing was carried out with a number 16 and number 12 B.S. sieve, i.e. they passed through the 12 but were retained on the 16 sieve.

The prepared granules were then inoculated with the bacteria (Rhizobia) which has been grown in a liquid culture medium by the normal method. Nutrient substances, namely 12.5% of skim milk powder and an equal volume of a saturated sucrose solution were added to the culture which was then sprayed on to the granules which were rotated in a tablet coating pan for the purpose. The plaster of Paris granules absorbed up to 20% by weight of the suspension, giving counts of bacteria up to 100 million per g.

After spraying the granules were spread out to dry at 65° F. for 24 hours before storing in a cool place.

EXAMPLE 2

1 kg. of lucerne seed was coated with 200 g. of plaster of Paris by rotating in a tablet coating pan and moistening with a 1½% by weight solution of sodium carboxymenthyl cellulose in water. A second coat of 400 g. of plaster of Paris was then applied using a saturated solution of sucrose in water as the adhesive. The coated seeds were spread out to dry at room temperature for 24 hours.

The inoculum consisting of a liquid culture with added milk powder and sucrose, as in Example 1, was sprayed on to the coated seeds in the same way as for the granules. The inoculated seeds were dried at 65° F. for 24 hours and stored in a cool place.

Laboratory tests have been carried out to show the effectiveness of the pelletted seeds (prepared as described in Example 2) and granules inoculated with Rhizobium cultures (prepared as described in Example 1) in producing nodulation in lucerne and clover plants.

In laboratory tests the seeds, either pelletted or mixed with inoculated granules in the ratio of 1 part by weight of granules to 10 parts of seeds were sown in sterile sand and grown for two months under sterile conditions. The plants were then removed from the sand and the percentage nodulation, i.e. the percentage of plants having one or more nodules, was determined.

Results— Percent nodulation

Lucerne seed:
  Fresh granule 1:10 _____ 70
  Stored granule 1:10 (9 weeks at 15° C.) _____ 53
  Pelletted inoculated seed (stored 12 weeks at
    15° C. _____ 60
  Agar slope culture _____ 53
  Uninoculated seeds _____ 3
Clover seed:
  Stored granule 1:10 (7 weeks at 15° C.) _____ 92
  Agar slope culture _____ 79
  Uninoculated seeds _____ 0

The plants grown from inoculated seeds have far greater percentage nodulation than those grown from uninoculated seeds where nodulation was negligible. Also the results obtained using the pelletted seeds and granules are at least as good, if not better, than those obtained using the conventional agar slope cultures, even after storage for three months.

Tests were also carried out to determine the number of live Rhizobia surviving on the inoculated granules after storage. The counts were obtained by crushing the granules and suspending them in Ringer solution. This procedure only gives minimum numbers of Rhizobia, as it is difficult to remove all the organisms from the insoluble calcium sulphate particles.

Counts obtained on a batch of granules for lucerne seed when stored at 25° C. were as follows:

Time: Rhizobia/gram of granules
  Initially _____ 1,800,000
  2 weeks _____ 980,000
  8 weeks _____ 300,000
  16 weeks _____ 198,000
  20 weeks _____ 134,000
  28 weeks _____ 95,000

At a sowing rate of 1 part by weight of granules to 5 parts of seed, this gives a minimum of 38 Rhizobia per seed after 28 weeks storage, and 720 per seed when used fresh.

Field trials were also carried out and the following results based on nodule assessment using unstored and stored inoculated granules as well as untreated controls are representative. The percentage nodulation and nodule score were estimated in the same way as in the laboratory tests.

| | Percent plants nodulated | Nodule score 100 plants |
|---|---|---|
| Inoculated granules 1:5 (unstored) | 69.0 | 475.0 |
| Inoculated granules 1:5 (stored 3 months) | 62.0 | 390.5 |
| Untreated (control) | 26.5 | 90.0 |

It is apparent that there is very little difference between the nodulation achieved with the stored and unstored granules, and both treatments give results considerably superior to the untreated control.

What is claimed is:

1. A product for seed inoculation comprising porous plaster of Paris granules containing from about 0.01 to about 0.2% of a setting retarder and inoculated with a culture of Azotobacter or Rhizobia bacteria containing a nutrient substance for said bacteria, said inoculation being effected by treating the granules with a liquid culture containing said bacteria and said nutrient substance.

2. A plant seed product comprising agricultural seeds admixed with plaster of Paris granules containing from about 0.01 to about 0.2% of a setting retarder and inoculated with a culture of Azotobacter or Rhizobia bacteria containing a nutrient substance for said bacteria, said inoculation being effected by treating the granules with a liquid culture containing said bacteria and said nutrient substance, said granules being mixed with said seeds at a weight ratio of from about 1:2 to about 1:50, the ratio of size of seeds to size of granules being from about 1:1 to about 1:1.2.

3. A product according to claim 2 wherein the setting retarder is sodium carboxymethyl cellulose.

4. A product according to claim 2 wherein the nutrient substance is selected from the group consisting of skim milk powder, sucrose, mannitol, gum arabic and carboxymethyl cellulose.

References Cited

UNITED STATES PATENTS

| | | | |
|---|---|---|---|
| 679,601 | 7/1901 | Caron | 71—7 |
| 2,995,867 | 8/1961 | Burton | 71—7 |
| 2,999,336 | 9/1961 | Cescas | 71—1 XR |
| 3,054,219 | 9/1962 | Porter et al. | 71—7 |

FOREIGN PATENTS 500,284   2/1939   Great Britain.

OTHER REFERENCES

Hackh's Chemical Dictionary, 3rd. edition, 1944, p. 664, McGraw-Hill Book Co., Inc.

Seeds: The Yearbook of Agriculture, 1961, pp. 326 and 327, The U.S. Dept. of Agriculture—U.S. Gov't. Printing Office.

S. LEON BASHORE, Primary Examiner

B. H. LEVENSON, Assistant Examiner

U.S. Cl. X.R.

47—58; 71—1, 64; 195—50, 59